(12) United States Patent
Yoo et al.

(10) Patent No.: US 9,194,437 B2
(45) Date of Patent: Nov. 24, 2015

(54) MOUNTING STRUCTURE OF DRIVE-SHAFT

(71) Applicant: Hyundai Motor Company, Seoul (KR)

(72) Inventors: Sung-Su Yoo, Hwaseong-Si (KR); Won-Jun Choi, Yangsan-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/132,880

(22) Filed: Dec. 18, 2013

(65) Prior Publication Data

US 2015/0105164 A1   Apr. 16, 2015

(30) Foreign Application Priority Data

Oct. 11, 2013  (KR) .......................... 10-2013-0121338

(51) Int. Cl.
*F16D 3/205*  (2006.01)
*F16D 3/24*  (2006.01)
*F16D 3/16*  (2006.01)
*F16D 3/18*  (2006.01)
*F16D 3/223*  (2011.01)

(52) U.S. Cl.
CPC .. *F16D 3/24* (2013.01); *F16D 3/16* (2013.01); *F16D 3/18* (2013.01); *F16D 3/2055* (2013.01); *F16D 2003/2232* (2013.01)

(58) Field of Classification Search
CPC ..................................... F16C 1/04; F16D 3/06
USPC ................ 464/111, 169, 904–906; 403/109.3
See application file for complete search history.

(56) References Cited

U.S. PATENT DOCUMENTS 5,674,024 A  * 10/1997  Daumal Castellon
7,708,352 B2 *  5/2010  Brooks ..................... 464/169 X
8,062,137 B2 * 11/2011  Arden et al. ................. 464/906

FOREIGN PATENT DOCUMENTS

JP        8-42526 A      2/1996
JP        9-169221 A     6/1997
KR   10-2005-0004675 A   1/2005

* cited by examiner

*Primary Examiner* — Gregory Binda
(74) *Attorney, Agent, or Firm* — Morgan, Lewis & Bockius LLP

(57) ABSTRACT

A mounting structure of a drive-shaft may include a shaft, a housing, a spring guide slidably disposed inside the housing having one end facing the shaft, and a spring with one end supported by a spring guide and the other end supported by the housing, in which a transmission has a companion flange with a cup-shaped coupling portion at an end, so when the housing enters the coupling portion, an elastic force of the spring biases the housing into the coupling portion.

7 Claims, 8 Drawing Sheets

← TRANSMISSION SIDE  WHEEL SIDE →

MOUNTING STRUCTURE OF DRIVE-SHAFT

CROSS-REFERENCE TO RELATED APPLICATION

The present application claims priority to Korean Patent Application Number 10-2013-0121338 filed Oct. 11, 2013, the entire contents of which is incorporated herein for all purposes by this reference.

BACKGROUND OF INVENTION

1. Field of Invention

The present invention relates to a mounting structure of a drive-shaft, and more particularly to a mounting structure of a drive-shaft that can prevent a constant velocity joint from separating by bringing a housing of the constant velocity joint connected to a transmission in close contact with a companion flange in respect to changes in length and bending angle of a shaft due to behavior of a wheel, in a vehicle, such as a rally car, which requires rapid replacement of a drive-shaft to reduce maintenance time.

2. Description of Related Art

Rallies are held for rally cars modified from common vehicles and running not on exclusive racing roads, but specific sections. There are differences in rule of rallies, but the cars taking part in the rallies are basically supposed to run a predetermined section within a given time.

Since the courses of rallies include not only common roads, but also mountain roads, icy roads, and deserts, the rally cars have to have high power that can provide a high speed and durability that makes it possible to run under bad conditions.

Further, in the rally cars, parts with a problem should be quickly replaced or repaired within a limited time and all of parts (particularly, the parts in the driving system that are necessary for driving the cars) should be separated or assembled as quick as possible for a routine check, even if they normally work.

That is, the rally cars frequently roll or fly at a high speed in accordance with the road or surrounding situations, so the parts of the driving system are likely to be damaged. Rapid maintenance is very important for obtaining good results in races.

On the other hand, the drive-shaft in the parts used in rally cars is connected to a transmission at one side and to a wheel at the other side to receive the driving force from the engine. The drive-shafts for rally cars are required to be able to be quickly separated and assembled, in addition to having high durability, as described above.

Figure 1A:
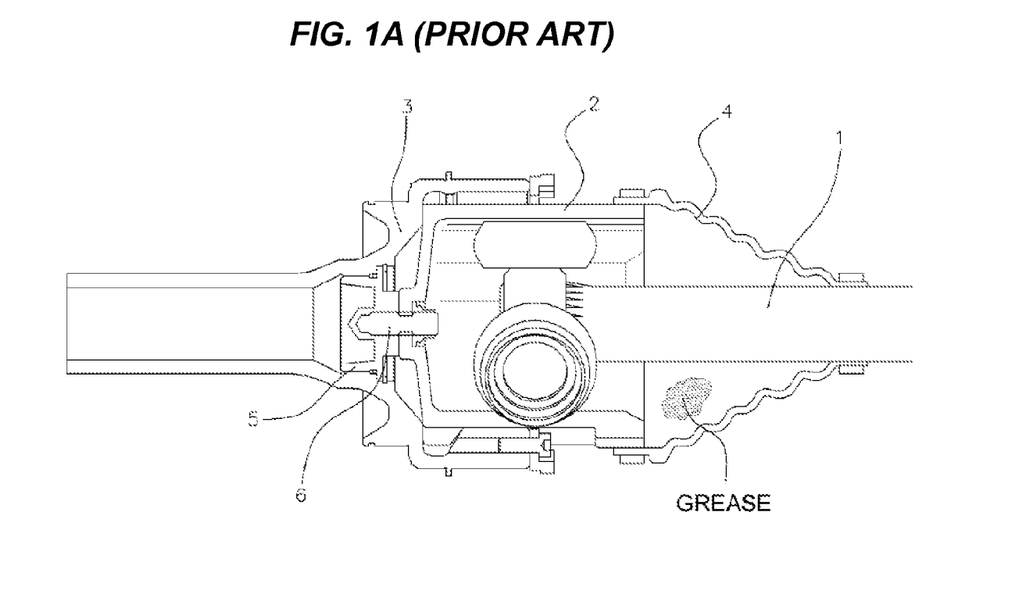
FIG. 1A is a cross-sectional view showing a combined state with a drive-shaft of the related art.
Figure 1B:
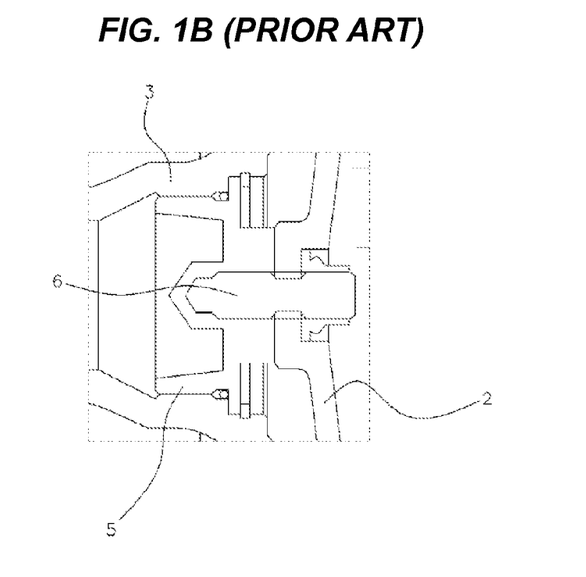
FIG. 1B is a partial enlarged view showing the combined state with the drive-shaft of the related art.

However, it was difficult to satisfy those conditions with the structures of the related art. That is, referring to FIG. 1A and FIG. 1B showing a constant velocity joint at a transmission of a drive-shaft for rally cars in the related art, a housing 2 is fitted on the end of a shaft 1 inside a companion flange 3 connected with a transmission (that is, which is the output of the transmission). The shaft 1 in the housing 2 transmits a driving force through a roller kit and is coupled such that a bending angle is generated and sliding is allowed, and the other end is connected to a wheel through a joint at the wheel.

The housing 2 is combined with a boot 4 and a predetermined amount of grease is in the boot 4 to lubricate the roller kit. Further, a boss 5 is fixed to the companion flange 3 and the housing 2 is bolted to the boss 5 by a fixing bolt 6.

According to the structure of the related art shown in FIG. 1A and FIG. 1B, since the housing 2 is firmly combined with the companion flange 3 by the fixing bolt 6, it is very safe in terms of preventing separation of the housing 2.

However, in the structure of the related art, in maintaining or when repairs or replacement is needed, it is required to take off the fixing bolt 6 fixing the housing 2 in order to remove the shaft 1 from the transmission. It was required to separate the boot 4 by removing a band fastening the boot 4 and then remove the grease too in order to take off the fixing bolt 6, which was very complicated. Further, in assembling, it was required to fixing the housing 2 to the companion flange 3 by tightening the fixing bolt 6, putting the grease into the boot, and then assembling the boot 4 and the band.

Accordingly, it was difficult to maintain the constant velocity joint in the assembled state (with the shaft and the housing combined) in the structure of the related art due to complicated assembly and separation. That is, it was required to separate the housing 2, the spider, the roller kit, and the shaft 1, respectively, in managing them.

The information disclosed in this Background section is only for enhancement of understanding of the general background of the invention and should not be taken as an acknowledgement or any form of suggestion that this information forms the prior art already known to a person skilled in the art.

BRIEF SUMMARY

Various aspects of the present invention provide for a mounting structure of a drive-shaft which can more conveniently assembled and disassembled and can prevent separation of a housing by bringing the housing in close contact with a companion flange, using the elastic force of a spring.

Various aspects of the present invention provide for a mounting structure of a drive-shaft which transmits a driving force of a transmission to a wheel and the mounting structure includes: a shaft with one end connected to a transmission and the other end connected to a wheel, a housing coupled to one end of the shaft which is disposed at the transmission, a spring guide slidably disposed inside the housing, with one end facing the end of the shaft, and a spring with one end supported by the spring guide and the other end supported by the housing, in which the transmission has a companion flange with a cup-shaped coupling portion at the end, so when the housing enter the coupling portion, with behavior of the shaft restricted due to combination with the wheel, an elastic force of the spring brings the housing in close contact with the coupling portion.

Spherical surfaces that protrude toward each other are formed at the end of the spring guide which faces the shaft and the end of the shaft which faces the spring guide, respectively.

The companion flange has a pipe-shaped extension that extends from the coupling portion and is connected to the transmission, and the housing has a protrusion that enters the extension and a seating groove where the spring is seated is formed at the protrusion.

A through-hole that is smaller than the inner diameter of the seating groove, communicates with a seating groove, and passes through a protrusion is formed at the protrusion, and the spring guide passes through the through-hole and is combined with the housing, with the end inside the extension.

The end of the spring guide which faces the shaft has a support portion with a spherical surface and the maximum outer diameter of the support portion is larger than the outer diameter of the spring, and the spring is a coil spring, seated in a seating groove with the spring guide fitted therein, and elastically compressed by the support portion.

A locking portion of which the diameter is elastically reduced when passing through the through-hole and of which the diameter is restored to the original size after passing through the through-hole is formed at the end of the spring guide positioned inside the extension.

A spider with three roller kits radially arranged is coupled to the end of the shaft, three seating portions are formed on the inner side of the housing so that the roller kits are disposed slidably in accordance with behavior of the shaft, and three grooves are formed between the seating portions, and locking portions that are inserted in the grooves protrude on the inner side of the coupling portion.

A plurality of teeth protrudes around the outer side of the housing and tooth-shaped grooves that are engaged with the tooth of the housing are formed around the inner side of the coupling portion.

According to the present invention having this configuration, since the housing is brought in close contact with the inside of the coupling portion of the companion flange by the elastic force of the spring, it is possible to prevent separation of the housing even if there is a change in length and bending angle of the shaft. Further, since a fixing bolt of the related art is not used, it is possible to quickly assemble and disassemble the drive-shaft in maintenance.

Further, the spring guide of the present invention has the shape of a bar and keeps in contact with the shaft. Accordingly, even if the shaft is pulled taken out to the outside (to the side where the wheel is mounted) and/or when a large bending angle is generated, the spring keeps applying pre-load that is needed for preventing separation of the housing, so the housing is pressed inside (to the transmission) and prevented from separating.

Further, since the ends of the spring guide and the shaft are formed in spherical surfaces facing each other and minimize the contact area, it is possible to prevent noise and frictional heat due to sliding.

Further, since the spring guide of the present invention has the locking portion of which the diameter can be elastically changed, it can be easily combined with the spring.

On the other hand, the constant velocity joint of the present invention can be implemented not only in a tripod type in which three roller kits are arranged along a shaft and a driving force is generated by engagement of grooves formed at the housing and locking portions formed at a coupling portion, but also in a serration type in which a plurality of teeth is formed around the outer side of a housing and grooves that are engaged with the teeth are formed around the inner side of a coupling portion, in a power transmission structure of a housing and a companion flange.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

A drive-shaft according to the present invention has one side coupled to a transmission and the other side coupled to a wheel (in detail, a wheel-hub combined with the wheel), in which the sides are coupled, respectively, by a joint.

Figure 2:
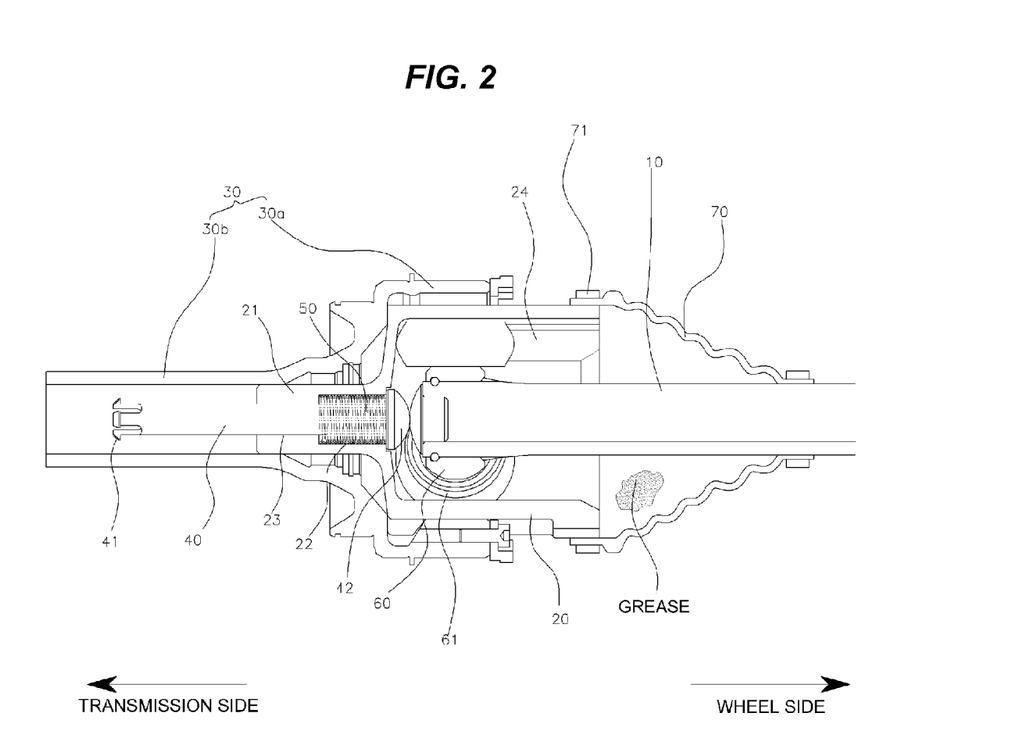
FIG. 2 is a longitudinal cross-sectional view of an exemplary constant velocity joint and drive-shaft according to the present invention.

As shown in FIG. 2, a constant velocity joint at the side connected with the transmission in the drive-shaft according to the present invention is fitted in a companion flange 30 through which a housing 20 combined with a shaft 10 is connected with the transmission.

Figure 3A:
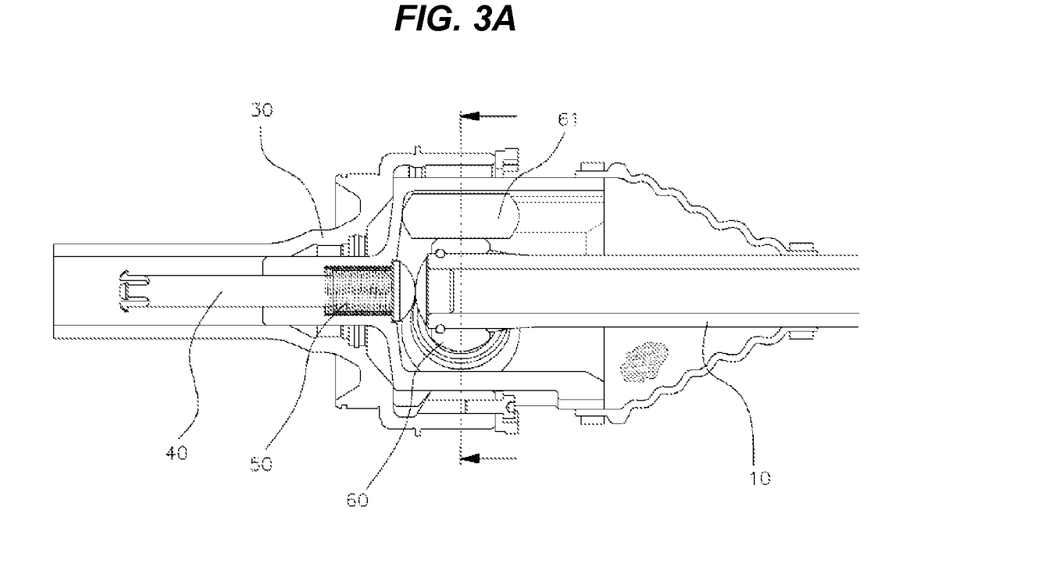
FIG. 3A is a cross-sectional view showing a constant velocity joint and drive-shaft.
Figure 3B:
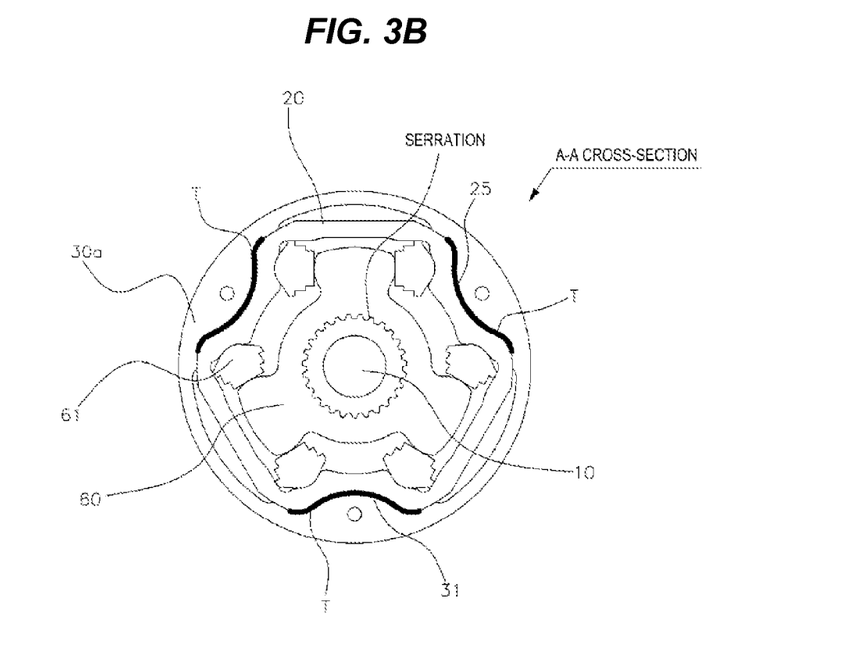
FIG. 3B is a transverse cross-sectional view of the constant velocity joint and drive-shaft of FIG. 2 taken along a line shown in FIG. 3A.
Figure 4:
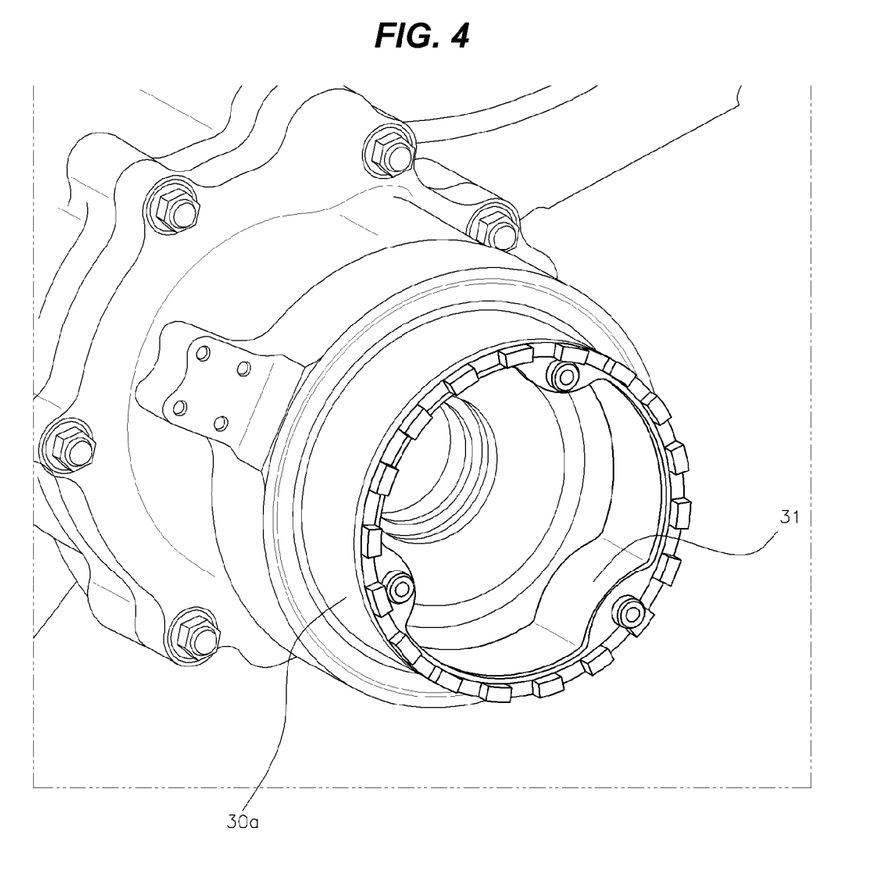
FIG. 4 is a view showing an exemplary companion flange according to the present invention.
Figure 5:
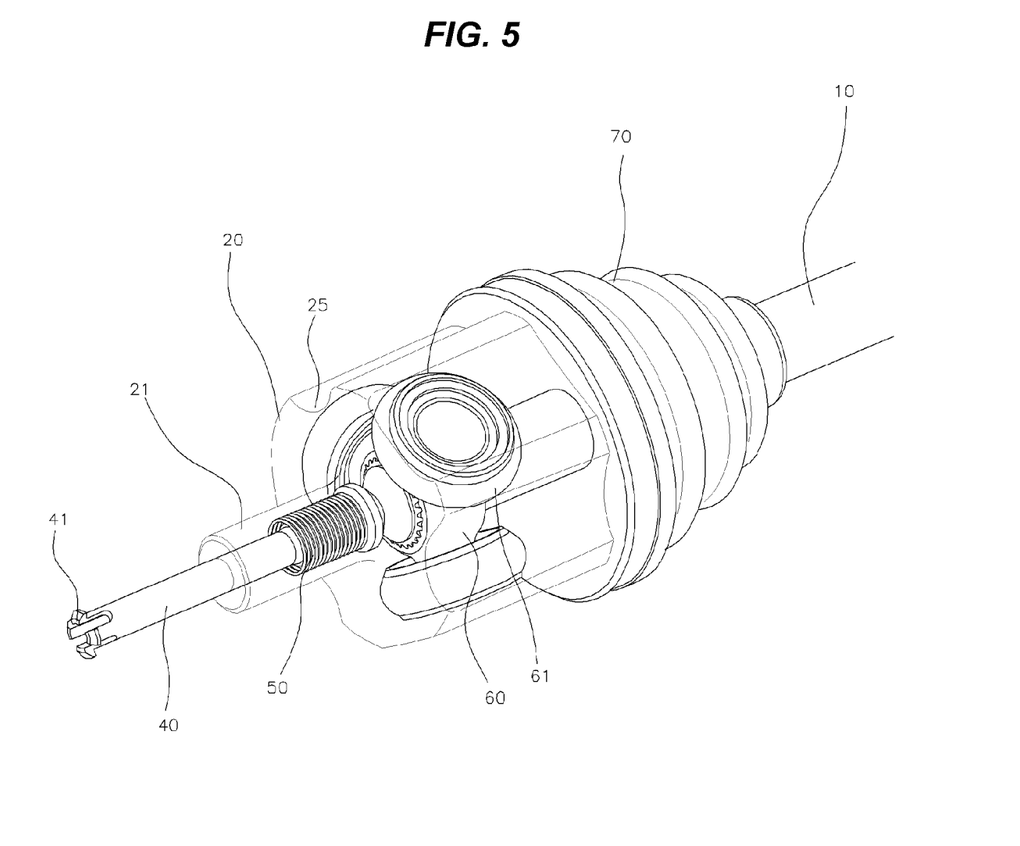
FIG. 5 is a perspective view showing an exemplary housing and shaft according to the present invention.

The housing is combined with a boot 70 by a band 71 and filled with a predetermined amount of grease for lubrication and three seats 24 are formed around the inner side in the longitudinal direction in the housing 20. Further, a spider 60 with three roller kits 61 radially arranged is coupled to the end of the shaft 20 the roller kits 61 enter the seats 24 to be able to slide with behavior of the shaft 10, as shown in FIG. 3A and FIG. 3B. Further, the housing 20 has three grooves 25 (see FIG. 5) along the outer side between the seats 24 and locking portions 31 that are locked into the grooves 25 protrude on the inner side of the companion flange 30, as shown in FIG. 4. Accordingly, a rotational force of the companion flange 30 is transmitted to the shaft 10 by the joints (indicated by T in FIG. 3B) of the grooves 25 and the locking portions 31.

One side of the shaft 10 of the drive-shaft of the present invention is connected to a wheel-hub (through a wheel-side joint) and the other side is connected with the transmission through the transmission-side constant velocity joint, as described above. In this configuration, when the shaft 10 is combined with the housing 20 and connected to the companion flange 30, the axial movement of the shaft is restricted within the limit of the behavior of the wheel (within the range in which the end of the shaft combined with the spider with roller kits radially arranged is not separated from the housing), because the wheel-hub is combined with a suspension device or a steering device such as a tie-rod, a knuckle, an arm, and a shock absorber.

The housing 20 has the shape of a cup with the grooves 25 around the outer side, the seats 24 where the roller kits 61 are seated around the inner side, as described above, and with a protrusion 21 to move at a predetermined depth inside (into extending portion) the companion flange 30. A seating groove 22 where a spring 50 is seated is formed at the protrusion 21 and a through-hole 23 smaller than the inner diameter of the seating groove 22 communicates with the seating groove 22, passing through the protrusion 21.

The spring guide 40 has a support portion 42 pressing and supporting one side of the spring 50 so that the spring 50 generates an elastic force and the spring guide 40 that is a cylindrical bar is disposed through the spring 50 that is shaped like a coil spring.

The companion flange 30 is rotated with a pipe-shaped extension 30b connected with the transmission and a coupling portion 30a formed in the shape of a cup with the diameter increasing is formed at the end of the extension 30b so that the housing 20 can enter it.

Further, in the present invention, the spring guide 40 is disposed in the housing 20, with one end facing the end of the shaft 10. The spring guide 40 has a predetermined length, is guided to slide on the inner side of the through-hole 23, and is combined with the housing 30, with the end inside the extension 30b.

Figure 7A:
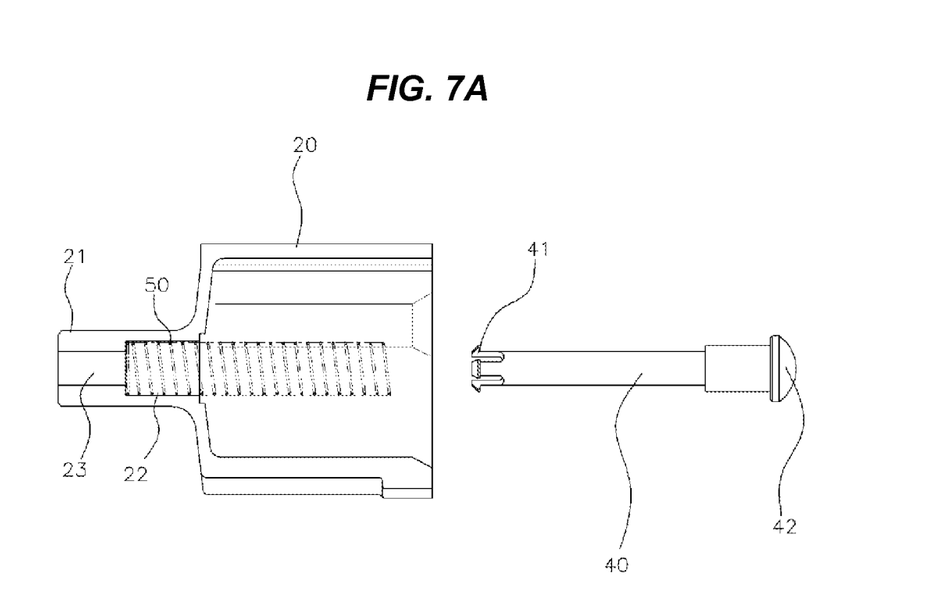
FIG. 7A is a view showing shapes before a spring guide is combined with a housing.
Figure 7B:
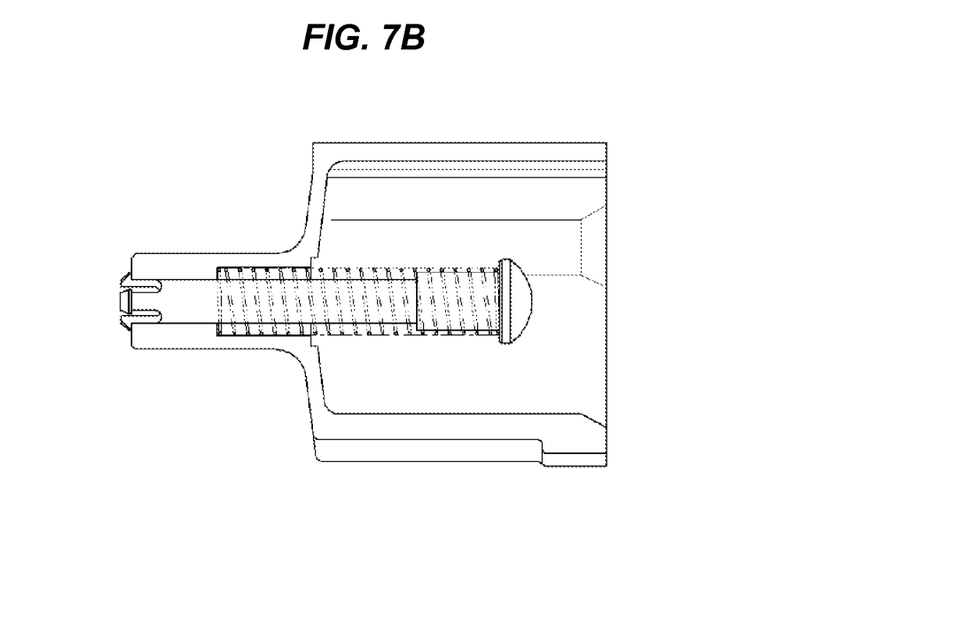
FIG. 7B is a view showing the shapes after the spring guide is combined with the housing, in accordance with the present invention.

A locking portion 41 of which the diameter elastically decreases when passing through the through-hole 23 and it restores to the original size after passing through the through-hole 23 is formed at the end of the spring guide 40 inside the extension 30b, as shown in FIG. 7A and FIG. 7B.

Further, the spring 50 is disposed in the housing 20 so that the spring guide 40 can be supported by the shaft 10 and can push the housing 20 to the coupling portion 30a of the companion flange 30. One end of the spring 50 is seated in the seating groove 22 of the housing 20 and the other end is supported by a support portion 42 increasing the outer diameter at the end of the spring guide 40.

On the other hand, spherical surfaces that protrude toward each other are formed at the end of the spring guide 40 which faces the shaft 10 and the end of the shaft 10 which faces the spring guide 40, respectively. That is, a spherical surface is formed at the support portion 42 of the spring guide 40 which faces the shaft 10, and has a maximum outer diameter larger than that of the spring 50, as shown in FIGS. 2 and 6B. Further, the spherical surface protruding from the end of the shaft is formed by machining, when the shaft is a solid shaft, or when the shaft shown in the figures is a tubular shaft, the spherical surface can be achieved by mounting a cap 11 with a convex side 11a on the end.

Figure 8:
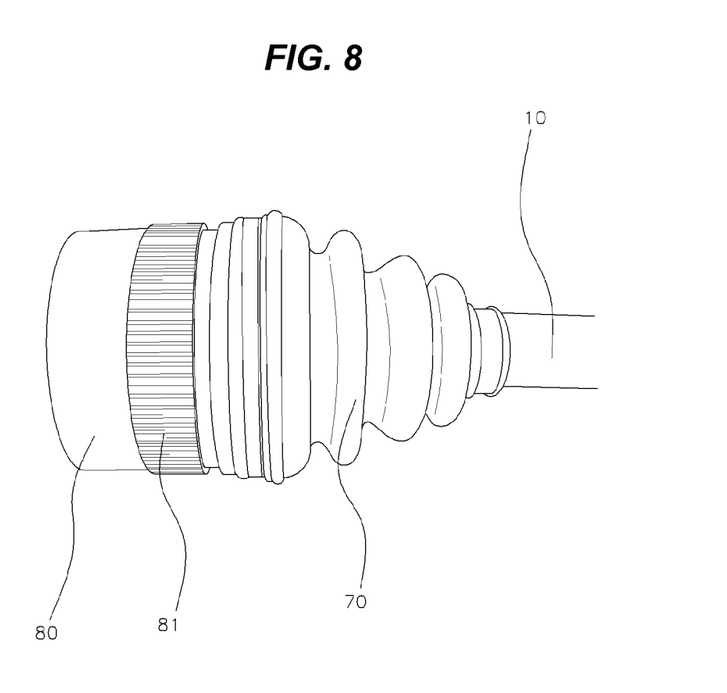
FIG. 8 is a view showing teeth formed around an outer side of the housing in accordance with the present invention.

Further, according to various embodiments of the present invention, the constant velocity joint may have a serration structure that is a power transmission structure with a companion flange and a housing combined and is generally used (instead of a tripod type described above). That is, the constant velocity joint according to various embodiments of the present invention may be configured such that, as shown in FIG. 8, a plurality of teeth 81 protrudes along the outer side of a housing 80 and tooth-shaped grooves (not shown) that are engaged with the teeth 81 of the housing 80 are formed on the inner side of a coupling portion of the companion flange. For reference, in various embodiments of the present invention described above, the coupling structure of the serration can be used for the coupling structure of the spider 60 and the shaft 10, as shown in FIG. 3A and FIG. 3B.

The constant velocity joint of a vehicle according to the present invention having the configuration can more efficiently prevent separation of the housing 20. That is, the spring 50 applies pre-load that is needed to prevent separation of the housing 20, even if the shaft 10 is pulled as much as possible to the outside (wheel), so it prevents separation of the housing 20 by pushing the housing 20 to the transmission, using the elastic force.

Further, the constant velocity joint of the present invention can improve the problem in quality by improving the convenience of maintenance and the number of parts that need to be managed, in comparison to the structures of the related art. That is, since the housing 20 and the shaft 10 are combined and can be stored and transported as one assembly, it is possible to easily manage the constant velocity joint and reduce the frequency of a problem in quality. Further, when the housing 20 is pulled (to the wheel) against the elastic force of the spring in maintenance, the spring 50 is compressed in the housing and can be easily separated. Further, after replacing and assembling, the compression force of the spring 50 pushes the housing 20 to the inner side of the companion flange 30, so the housing can be prevented from separating.

Further, since the spring 50 between the housing 20 and the spring guide 40 is compressed by the contact of the spherical surfaces between the end of the spring guide 40 and the end of the shaft 10 in the housing 20, an axial force (force exerted in the longitudinal direction of the spring guide) is always applied to the housing 20, so the housing 20 can be more efficiently pressed.

Figure 6A:
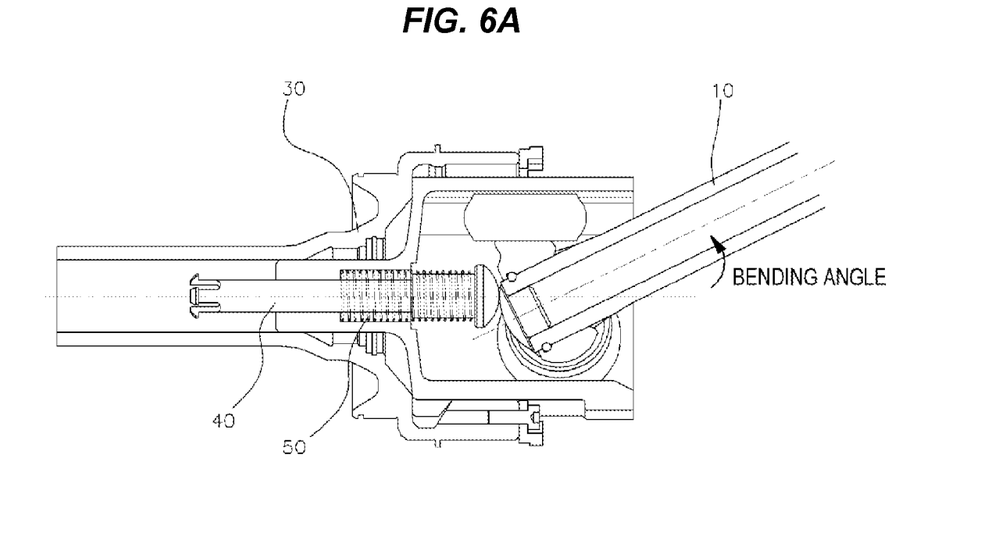
FIG. 6A is a cross-sectional view showing when there is a change in bending angle and length of the shaft in the constant velocity joint (that is, when the wheel-sided end of the shaft moves with the wheel in accordance with steering and surrounding situations)
Figure 6B:
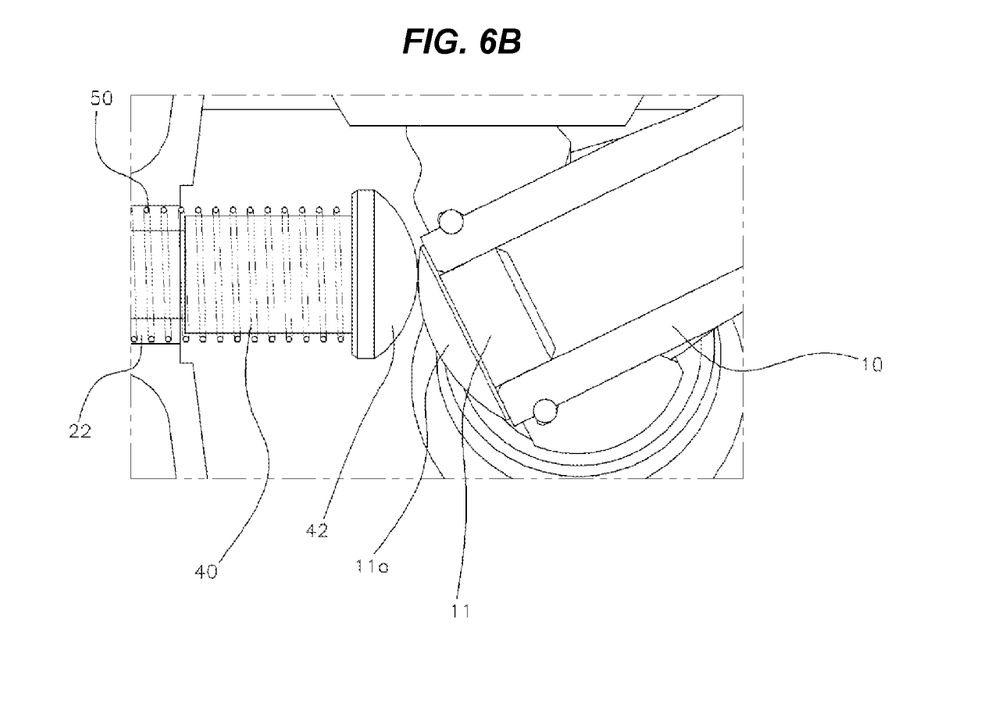
FIG. 6B is a partial enlarged view showing when there is the change in bending angle and the length of the shaft in the constant velocity joint, according to the present invention.

That is, as shown in FIG. 6A and FIG. 6B, even if a bending angle is generated at the shaft 10, the elastic force of the spring 50 does not generate a radial force (force generated perpendicular to the longitudinal direction of the spring guide) as a component force in the housing 20, so the whole elastic force of the spring can be concentrated for pushing the housing 20.

Further, the contact structure of the spherical surfaces that generates a sliding movement can increase the operation region of the constant velocity joint. That is, since there is no interfering factor in behavior of the shaft 10, the bending angle and the sliding distance (that the roller kits can slide) can be increased.

Since the spring guide 40 of the present invention has the bar shape, applying an elastic force to the shaft 10 and the housing 20 by compressing the spring 50, it is possible to prevent bending (buckling) of the spring 50 which may cause when the spring 50 is compressed and to fix the position of the spring 50 by separating the spring 50 from being separated from the position by a centrifugal force in high-speed rotation of the constant velocity joint.

Further, the grease filled in the housing 20 is applied to the inside of the through-hole 23 too, so it is possible to prevent friction, when the spring guide 40 slides. Further, the locking portion 41 formed at the spring guide 40 makes the spring guide 40 and the housing 40 easily combined, and the diameter restores after it passes through the through-hole 23, so the spring guide 40 is prevented from flying due to the elastic force of the spring 50.

On the other hand, the length of the spring guide 40 according to the present invention is set on the basis of the maximum position to which the shaft 10 can moves outside. If the length of the spring guide 40 is set too large, the spring guide 40 pushes the parts (roller kits) in the housing 20 out of the operation region by the elastic force of the spring 50, so they may be taken out of the housing 20, the boot 70 may be stretched over the limit and torn, and the band 71 may be loosened. Accordingly, the pre-load determined by the spring 50 should be set at the minimum load for preventing separation on the basis of the maximum position to which the shaft 10 can move outside.

For reference, in various embodiments of the present invention, the coupling at the transmission (companion flange and shaft) is implemented in a tripod joint type, in which a bending angle and sliding of the shaft 10 are allowed, but the coupling at the wheel (wheel hub and shaft) is implemented in a ball joint type, in which only a change in bending angle of the shaft 10 is possible. On the other hand, the wheel-side joint combined with the wheel is fixed to the wheel-hub by nuts or bolts and restricts sliding in the axel direction, and in the transmission-side constant velocity joint, the housing 20 is pressed to the companion flange 30 by the elastic force of the spring 50.

Further, since the present invention has the structure without fixing bolts in comparison to the structure of the related art, when a force over the elastic force of the spring 50 is applied, the housing 20 may be separated from the companion flange 30 during traveling. Accordingly, the elastic force of the spring 50 should be appropriately set so that the housing is not separated even under any traveling conditions. That is, when the shaft 10 is fully moved outward (to the wheel) by movement of the wheel (in accordance with steering or due to bump/rebound of a suspension), the elastic force of the spring 50 and the length of the spring guide 40 are set in consideration of the contact point of the spring guide 40 and the shaft 10.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalent

What is claimed is:

1. A mounting structure of a drive-shaft which transmits a driving force of a transmission to a wheel, comprising:
    a shaft including a first end operably connected to a transmission and a second end operably connected to a driven wheel;
    a housing operably coupling the first end of the shaft to the transmission;
    a spring guide slidably disposed inside the housing, including an end facing the first end of the shaft; and
    a spring with one end supported by the spring guide and another end supported by the housing,
    wherein the transmission has a companion flange including a cup-shaped coupling portion, so when the housing enters the coupling portion, with the shaft operably coupled with the driven wheel, an elastic force of the spring biases the housing into the coupling portion, and
    wherein spherical surfaces that protrude toward each other are formed at the end of the spring guide which faces the shaft and the first end of the shaft which faces the spring guide, respectively.

2. The structure of claim 1, wherein:
    the companion flange has a pipe-shaped extension that extends from the coupling portion and is connected to the transmission; and
    the housing has a protrusion that enters the extension and a seating groove where the spring is seated is formed at the protrusion.

3. The structure of claim 2, wherein:
    the protrusion includes a seating groove having an inner diameter and a through-hole having a diameter smaller than the inner diameter of the seating groove extending axially through the protrusion; and
    the spring guide extends within the extension, passes through the through-hole, and is mounted to the housing.

4. The structure of claim 3, wherein a locking portion of which the diameter is elastically reduced when passing through the through-hole and of which the diameter is restored to the original size after passing through the through-hole is formed at on the spring guide positioned inside the extension.

5. The structure of claim 2, wherein:
    the end of the spring guide which faces the shaft includes a support portion with a spherical surface having a maximum outer diameter that is larger than an outer diameter of the spring; and
    the spring is a coil spring, seated in a seating groove with the spring guide fitted therein, and elastically compressed by the support portion.

6. The structure of claim 1, wherein:
    a spider with three roller kits radially arranged is coupled to the end of the shaft;
    three seating portions are formed on the inner side of the housing so that the roller kits are disposed slidably in accordance with behavior of the shaft, and three grooves are formed between the seating portions; and
    locking portions that are inserted in the grooves protrude on the inner side of the coupling portion.

7. The structure of claim 1, wherein a plurality of teeth protrude around an outer side of the housing.

\* \* \* \* \*